United States Patent [19]
Ducreux et al.

[11] Patent Number: 5,654,192
[45] Date of Patent: Aug. 5, 1997

[54] COMPOSITION CONTAINING A SURFACE ACTIVE COMPOUND AND GLYCOLIPIDS AND DECONTAMINATION PROCESS FOR A POROUS MEDIUM POLLUTED BY HYDROCARBONS

[75] Inventors: Jean Ducreux, Bougival; Daniel Ballerini, St. German en Laye; Marc Baviere, Noisy le Roi; Christian Bocard, Orgeval; Nicole Monin, Cormeilles en Parisis, all of France

[73] Assignee: Institut Francais du Petrole, Rueil-Malmaison, France

[21] Appl. No.: 461,014

[22] Filed: Jun. 5, 1995

Related U.S. Application Data

[62] Division of Ser. No. 176,579, Dec. 30, 1993, abandoned.

[30] Foreign Application Priority Data

Dec. 30, 1992 [FR] France .................... 92 16033

[51] Int. Cl.$^6$ ..................... D06M 16/00; C12P 19/04
[52] U.S. Cl. ..................... 435/262; 435/264; 435/101
[58] Field of Search ..................... 435/262, 101, 435/264

[56] References Cited

U.S. PATENT DOCUMENTS

| | | | |
|---|---|---|---|
| 3,920,586 | 11/1975 | Banaparte et al. | 252/107 |
| 4,201,844 | 5/1980 | Inoue et al. | 435/101 |
| 4,215,213 | 7/1980 | Inoue et al. | 536/115 |
| 4,704,360 | 11/1987 | Shoham et al. | 435/101 |
| 4,793,826 | 12/1988 | Hayes et al. | 252/107 |
| 5,008,383 | 4/1991 | Bu'lock et al. | 435/101 |
| 5,102,561 | 4/1992 | Vanderslice et al. | 435/101 |
| 5,128,262 | 7/1992 | Lindoerfer et al. | 435/264 |
| 5,232,596 | 8/1993 | Castaldi | 434/101 |
| 5,326,407 | 7/1994 | Baviere et al. | 435/101 |
| 5,352,444 | 10/1994 | Cox et al. | 424/76.5 |
| 5,358,656 | 10/1994 | Humphreys et al. | 252/107 |

FOREIGN PATENT DOCUMENTS

| | | |
|---|---|---|
| 0048339 | 3/1982 | European Pat. Off. . |
| 0310005 | 4/1989 | European Pat. Off. . |
| 0499434 | 8/1992 | European Pat. Off. . |
| 2437874 | 4/1980 | France . |
| 2053182 | 2/1981 | United Kingdom . |

OTHER PUBLICATIONS

"Effect of the Addition of Microbial Surfactants on Hydrocarbon Degradation in a Soil Population in a Stirred Reaction", Oberbremmer et al., Appl. Microbiol. BIOTECH., vol. 32 (4), 1990, pp. 485–499, Fichier Biosis, AN 90:154490, ISSN 0175–7598 (Summary).

*Primary Examiner*—John Kight
*Assistant Examiner*—Louise Leary
*Attorney, Agent, or Firm*—Millen, White, Zelano, & Branigan, P.C.

[57] ABSTRACT

The invention relates to a decontamination process for a porous medium polluted by hydrocarbons according to a composition containing a surface active agent as glycolipids in their crude or modified form is introduced, for example by at least one input well, in the optional presence of hydrocarbon-destroying bacteria and at least one part of the composition containing at least one part of the hydrocarbons is collected, for example by a production well.

15 Claims, No Drawings

COMPOSITION CONTAINING A SURFACE ACTIVE COMPOUND AND GLYCOLIPIDS AND DECONTAMINATION PROCESS FOR A POROUS MEDIUM POLLUTED BY HYDROCARBONS

This is a division of the application Ser. No. 08/176,579 filed Dec. 30, 1993, now abandoned.

BACKGROUND OF THE INVENTION

The invention relates to a composition containing at least one surface active compound and glycolipids at least in part in the form of esters and the use of the composition and more generally of a composition containing glycolipids which may be in this derivative form or in crude form in a decontamination process for a medium polluted by hydrocarbons.

Contamination of soils and groundwater tables by hydrocarbons often results from infiltration by a petroleum product following leakage from a tank or a pipe system or from an accidental spillage at ground level. The risks associated with the presence of hydrocarbons in the soil are related, on the one hand to safety, due to risks of explosion of the volatile hydrocarbon vapours, and on the other hand, to the quality of underground water due to the solubilization of aromatic hydrocarbons such as benzene, toluene, xylenes, ethylbenzene, naphthalene and certain aliphatic hydrocarbons such as iso- or cycloalkanes and olefines.

In order to restore a contaminated aquifer a start is generally made by recovering the fluid pollutant on the surface of the ground water table by making it migrate towards a pumping well. Also, it is often necessary to eliminate the residual product trapped in the unsaturated zone and in the beat region as it constitutes a long-term risk.

Various methods employed in situ have been described to eliminate petroleum hydrocarbons in residual quantities in the soil. They consist of either extracting the soil pollutant or of destroying it by biodegradation in situ or a combination of these two treatments. Extraction can be carried out in gas phase by entraining the hydrocarbons with air circulated in the contaminated unsaturated zone by means of a ventilator connected to an extraction well; this technique is only applicable to volatile fractions and can require a long period of operation. Extraction of the residual products has also been proposed by cleansing the contaminated zone with water containing surfactants and by using an input well and a well for the recovery of effluents.

The use of surfactants has also been proposed to activate the biodegradation in situ of residual hydrocarbons by increasing their accessibility to bacteria, nutriments and oxygen.

The surfactants described to facilitate the extraction of hydrocarbons in the form of emulsions in water or to activate their biodegradation are in general non-ionic compounds, for example a polyethoxylated fatty alcohol or a polyethoxylated nonylphenol, or anionic compounds, for example those of the sulphonate family.

However, the use of these surfactants has its own limits due to the fact that it leads to biodegradation rates and elimination rates of the hydrocarbons from the porous medium which are not sufficiently high.

The prior art is for example described in the Patent EP-A-0 499 434 (Unilever), which describes a composition containing a glycolipidic surfactant (sophorolipid) in its crude form (mixture of acid and lactone forms) and an anionic, cationic or non-ionic surfactant, in particular used for its detergent properties during textile washing operations, and Biosis, (AN 90: 154 490) Appl. Microbiol. Biotechnol. vol 32. No. 4, 1990, pages 485–489, ISBN 0 175-7598, which describes the effect of the addition of sophorolipidic surfactants on the degradation of hydrocarbons by bacteria in a soil and on the biomass thus produced.

Other Patent Applications FR-A-2,437,874, EP-A-0,310, 005, GB-A-2, 053, 182 and EP-A-0, 048, 339 also illustrate the prior art.

It has also been found to be advantageous to use formulations of surfactants to simultaneously activate the two process mentioned above, for example non-ionic or anionic surfactants containing a glycolipidic cosurfactant, advantageously from the family of sophorolipids and preferably glycolipids, usually sophorolipids, at least in part in the form of esters. It is also thought that the use of such a compound improves the interfacial properties of the synthetic surfactants, and in particular, increases the lowering of the water-oil interfacial tension, and makes the injected aqueous solution more stable by reducing losses of active ingredient by adsorption on soil particles and, in the case of the use of anionic surfactants, by reducing in particular the colmation of the porous medium resulting from the precipitation of the calcium salts of these compounds in the presence of calcium-containing clay.

SUMMARY OF THE INVENTION

One of the subjects of the invention is to respond to the technical problem raised above and to remedy the disadvantages of the prior art, in particular to maximize the accessibility of the hydrocarbons to the bacteria and as a consequence, minimize the quantity of residual hydrocarbons in the polluted site.

Thus it has been observed more precisely that a composition containing 0.01 to 99.99% by weight of at least one surface active compound and 99.99 to 0.01% by weight of at least one glycolipid in its derivative form allows good results to be obtained. The glycolipids and more particularly the sophorolipids can be used in a crude form or advantageously in a derivative form, for example at least in part chemically modified in the form of an ester of organic acids by reaction with a linear or branched alcohol containing 1 to 18 carbon atoms, preferably from 1 to 8 carbon atoms. Furthermore it was noted that with a composition containing advantageously from 45 to 85% by weight of a surface active compound, preferably 50 to 65% and from 15 to 55% of glycolipids and advantageously sophorolipids and preferably 35 to 50%, the decontamination of a porous medium polluted notably by hydrocarbons was achieved in a very substantial fashion.

According to one characteristic of the composition, the surface active compound can be anionic. It can be advantageously chosen from the alkylarylsulphonates in the form of sodium or calcium salts, or in the form of linear or branched amines with the number of carbon atoms comprised between 2 and 8, with alkyl chains with 10 to 16 carbon atoms, aryl groups with 1 to 10 carbon atoms, the aryl group can be preferably phenyl or naphthyl and sulphonate groups with 1 to 2 carbon atoms. It can also be chosen from the mono- or diesters of sodium sulphosuccinate having been reacted with linear or branched alcohols with 6 to 20 carbon atoms such as sodium dioctylsulphocuccinate, the alkyl or alkenyl sulphonates of sodium with C10 to C18 alkyl or alkenyl groups, the sulphonates of commercial petroleum, originating from the sulphonation of a crude petroleum cut and sodium or calcium or ammonium lignosulphonates.

According to another characteristic of the composition, the surface active compound can be non-ionic. It can be chosen from the polyethoxylated alkylphenols with the number of ethoxyl groups comprised between 8 and 24 and alkyl groups with the number of carbon atoms comprised between 8 and 12 such as nonylhenol ethoxylated with 9 moles of ethylene oxide (NP 9), polyoxyethylene alkylphenoxy-ethanol, the esters of polyethoxylated fatty acids and the ethers of polyethoxylated fatty alcohols with the number of carbon atoms of the fatty acid or fatty alcohol comprised between 4 and 12 and a number ethoxyl groups comprised between 4 and 12, and the mono- and polyoleates of sorbitol polyethoxylated with a number of ethoxyl groups comprised between 4 and 8.

The surface active compound can be cationic or zwitterionic.

Obviously the glycolipids must be soluble in water (at least 0.1 g/l for example). They are generally produced by bacterial fermentation and are biodegradable.

Among the glycolipids contained in the composition the following can be mentioned: rhamnolipids, glucoselipids, trehaloselipids, cellobioselipids and sophorolipids, either by themselves or in a mixture.

The sophorolipids can be produced by fermentation by using the process described in the Patent FR 2670798 by the Applicant. They are considered as being a mixture of compounds the structures of which can be represented by formulae (1) and (2), corresponding to the acid form and the lactone form respectively.

In formulae (1) and (2), R1 represents hydrogen or an acetyl group (CH₃CO—), R2 represents hydrogen or an alkyl radical containing 1 to 9 carbon atoms when R3 is a saturated hydrocarbon radical containing 7 to 16 carbon atoms, or R2 represents hydrogen or a methyl group when R3 is an unsaturated hydrocarbon radical containing 13 to 17 carbon atoms.

Formula (1)

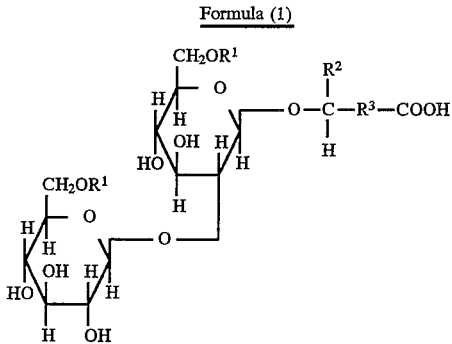

Formula (2)

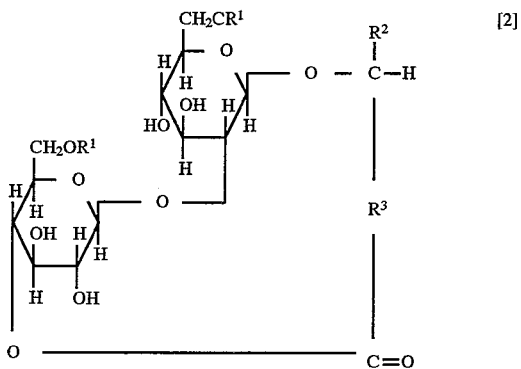

The preparation and the fermentation conditions of the other glycolipids mentioned above are described in the Patent Application EP 0,499,434. For example, the rhamnolipids of formula I are produced from a bacterium of Pseudomonas genus using sugar, glycerol or an alkane as substrate. The glucoselipids of formula II can be produced from the bacterium Alcaligenes sp., the trehaloselipids of formula III from Arthrobacter sp. or *Rhodococcus erythropolis* and the cellobioselipids of formula IV from the Ustilago genus.

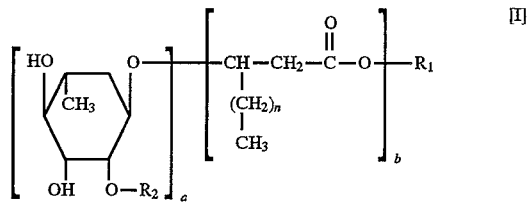

where a is equal to 1 or 2; b is equal to 1 or 2; n=4 to 10, preferably 6, $R_1$ is H or a cation, preferably H, $R_2$ is H or the $CH_3(CH_2)_m$ CH=CH—C-group, preferably H, m=4 to 10.

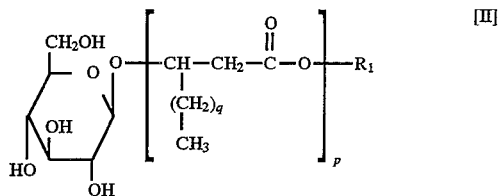

where $R_1$ is H or a cation, p=1 to 4, q=4 to 10, preferably 6.

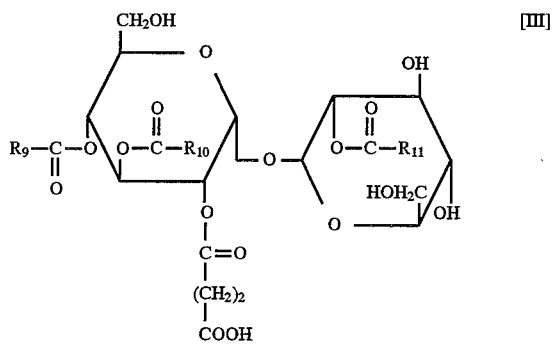

where $R_9$, $R_{10}$ and $R_{11}$ are each a saturated or unsaturated, hydroxylated or not hydrocarbon group with 5 to 13 carbon atoms.

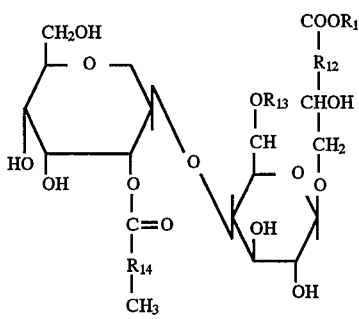

where $R_1$ is H or a cation, $R_{12}$ is a saturated or unsaturated, hydroxylated or not hydrocarbon group with 9 to 15 carbon atoms, preferably 13; $R_{13}$ is H or an acetyl group, $R_{14}$ is a saturated or unsaturated, hydroxylated or not hydrocarbon group with 4 to 16 carbon atoms.

The product may originate directly from a fermentation wort. By varying the fermentation conditions of the sophorolipids for example, its composition can be modified which can correspond to a percentage of acid forms comprised between 10 and 90% and an acetylation rate of 50 to 80%. The Applicant has, in particular, described a production process for sophorolipids capable of containing, for example, at least 60% of acid forms (French Patent Applications under numbers 92/06900 and 92/07409). This crude mixture of acid and lactone forms may subsequently be the subject of chemical modifications (partial or total deacetylation and/or delactonization) which allows the structure and therefore the properties of the majority compounds to be better adapted to the requirements of the application. For example, their surface active properties which are characterized by their HLB (hydrophilic-lipophilic balance) can be easily adjusted.

The chemical modifications to the glycolipids resulting from the fermentation can consist in particular, when they contain acetylated groups and/or a lactone form, of a partial deacetylation and of a partial delactonization in 1N $H_2SO_4$ medium at 55° C. followed by neutralization. At least a partial esterification on the $H^+$ resins of the carboxylic acid group can be obtained with alcohols whose structure and molecular mass also constitute parameters for the adjustment of properties.

For example, in the case of sophorolipids, the esterification with methanol leads to a mixture being obtained which contains the lactone form and methyl esters of partially deacetylated acid form. This type of sophorolipids can have a lactone content comprised between 5 and 70% and an acetylation rate varying between 30 and 70%.

An almost total deacetylation and delactonization of the sophorolipids can be obtained by saponification, followed by a neutralization. The esterification on the $H^+$ resins of the carboxylic acid group by the alcohols mentioned above, methanol in the present case, leads to methyl esters being obtained of totally deacetylated acid form and containing virtually no more lactones.

The cellobioselipids can be deacetylated in an almost total fashion followed by a neutralization, then optionally esterified as described above.

The alcohols used for the esterification reaction can be linear or branched primary alcohols with 1 to 18 carbon atoms, preferably 1 to 8 carbon atoms. Methanol and ethanol are particularly advantageous.

As it has been mentioned above, the invention relates to a decontamination process for an underground formation polluted by hydrocarbons according to which the composition of glycolipids in their crude or derivative form, i.e. chemically modified, is injected in aqueous solution into said formation, by means of at least one injection well for example, in a sufficient quantity and under appropriate conditions for substantially decontaminating the medium and at least one part of the solution containing at least one part of the hydrocarbons is recovered, for example, by a recovery well.

More generally, a composition can be used containing by weight 0.01 to 99.99% and preferably 50 to 65% of at least one surfactant and 99.99 to 0.01% and preferably 35 to 50% of at least one glycolipid, for example, sophorolipids, glucoselipids, cellobioselipids, rhamnolipids and trehaloselipids used by themselves or in a mixture, described and prepared according to the Patent Application EP-A-0,499, 434, in their crude form or in their chemically-modified form, such as those described above.

In order to decontaminate the underground formation or the porous medium polluted by hydrocarbons, the composition containing sophorolipids in crude form can be used advantageously, i.e. in the form of a mixture of acid and lactone forms as described above and preferentially in the form of a mixture containing the partially delactonized form and partially deacetylated methyl esters.

According to one characteristic of the process, 0.1 to 20 pore volumes ($V_p$) and, preferentially, 0.5 to 10 pore volumes of the solution containing the composition can be introduced into the polluted medium at a concentration of 0.1 to 20 grams per liter of aqueous solution.

According to another characteristic of the process, the aqueous solution containing the composition can contain 0.01 to 1% by weight of at least one additive chosen from the group formed by sodium nitrate, potassium nitrate, ammonium nitrate, potassium phosphate, sodium phosphate, ammonium phosphate and a composition of hydrosoluble polymers of high molecular mass such as xanthane or polyacrylamide. Liquid fertilizers based on nitrogen, phosphorus and potassium may be quite suitable.

To facilitate the biodegradation of the pollutant, and insofar as where the level of bacteria in situ proves to be insufficient, $1 \times 10^5$ to $1 \times 10^9$ hydrocarbon-destroying microorganisms per milliliter of aqueous solution can be introduced into the polluted formation, such as bacteria belonging to the genera Pseudomonas, Flavobacterium, Arthrobacter, Corynebacterium, Moraxella, Nocardia, amongst others.

The restoration of soils contaminated by petroleum products can be carried out using physical chemistry methods or a combination of the latter with microbiological methods. The fundamental principle of biorestoration consists of stimulating in situ the microbial degradation of pollutants by improving the accessibility of the hydrocarbons to microorganisms for example by adding surfactants and by optionally introducing limiting elements such as mineral elements, nitrogen and phosphorous in the form of their salts in solution in water and oxygen if necessary by improving the aeration of the porous medium.

In certain cases where the microbial flora in situ is not sufficiently active, the polluted porous medium can be inoculated by injecting microorganisms selected for their ability to degrade hydrocarbons and cultivated beforehand in a reactor.

All these additions in situ are carried out in general according to the different types of input, by vertical suction strainer wells, by horizontal drainage trenches or by means of drains installed by horizontal drilling techniques.

These inputs can be carried out under the effect of gravity, under pressure, by alternative sequences of impregnation phases (saturation of the porous medium and supply of nutriments) and of drainage phases (aeration of the porous medium). Depending on the permeabilities of the polluted soils, the flow rates of the injected fluids can be comprised between 0.1 and 10 $V_p$/h and advantageously between 0.5 and 5 $V_p$/h. In general, the treatments operate according to the "doublets" method which combines namely:

- one injection well or trench with a recovery well where the displaced oil phase is separated from the effluents containing in part the injected composition, one part of the effluents being able to be recycled after readjustment of the content of the different additives, mineral elements and surfactants, the remaining part being treated on site by various processes of demulsification or adsorption, for example, before being discharged to the environment when its characteristics conform to the standards for environmental protection.

- a central injection well surrounded by several recovery wells.

- several peripheral injection wells or trenches and a central recovery well.

When the groundwater table to be treated serves as a drinking water resource, the choice of surfactants used will be affected by taking into consideration, in particular, their non-persistence. For example, sodium dioctylsulphosuccinate and the sophorolipids are quite suitable.

The invention will be better understood with reference to the following examples which illustrate the invention in a non-limitative manner. Examples 1 to 6 show the rôle as cosolvant played by the sophorolipids and the rhamnolipid in the composition while Examples 7 to 12 illustrate their rôle as cosurfactant. In addition, Examples 13 to 23 demonstrate a surprising synergic effect as regards decontamination of a porous medium polluted by hydrocarbons. Finally, Example 24 illustrates the effectiveness of extraction using a formulation containing sophorolipids.

EXAMPLE 1

This example relates to the adsorption of a conventional anionic surfactant, sodium dioctyl-sulphosuccinate (DOS) (Rhône-Poulenc, France), sophorolipids in the form of partially delactonized (proportion of lactone: 55%) and partially deacetylated (rate of acetylation: 45%) methyl esters referenced GH153 and a mixture of the two products, on a clay sand called Saint-Ouen sand (France) with a granulometry of less than or equal to 800 µm. The initial solution in which these products are dissolved is tap water, containing 107 ppm of $Ca^{2+}$ ions and to which sodium chloride has been added (2 g/l).

The adsorption measurements are carried out on powder (so-called batch tests). The mixture constituted by the aqueous solution of surfactant and sand (weight ratio liquid/solid=4) is agitated for two hours in an oven maintained at 20° C. After decanting, the supernatant solution is analyzed. The initial conditions are such that the concentration of the surfactants, including that of the sophorolipids, in the supernatant solution is greater than the critical micellar concentration. The adsorption measured is therefore that corresponding to the plateau of the adsorption isotherm.

The quantity of compound adsorbed is determined by the method of remainders, by analysis of the surfactant and/or the sophorolipids in the initial solution and in the supernatant solution obtained after contact with the sand. The DOS, as well as the other sulphonates mentioned previously, is analyzed by the Brewer method: titration with hyamine in diphase mixture. In a general way the sophorolipids and glycolipids are analyzed by the so-called method using anthrone.

The results are given in the table below.

| | Initial solution | | Quantity of surfactant |
|---|---|---|---|
| Surfactant | | Concentration (g/l) | adsorbed (mg/g of sand) |
| DOS | | 3 | 1.8 |
| GH 153 | | 3 | 2.1 |
| DOS + GH 153 | | 3 | 0.5 |
| | | 3 | (n.d.) |

(n.d.) non determined

EXAMPLE 2

The conditions are the same as in Example 1, but the DOS is replaced by a petroleum sulphonate of equivalent average molecular mass 415, Petrostep B100 distributed by STEPAN EUROPE (France).

| | Initial solution | | Quantity of surfactant |
|---|---|---|---|
| Surfactant | | Concentration (g/l) | adsorbed (mg/g of sand) |
| B100 | | 3 | 1.6 |
| B100 + GH 153 | | 3 | 0.7 |
| | | 3 | (n.d.) |

EXAMPLE 3

The conditions are the same as in Example 1, but the DOS was replaced by an isopropylamine dodecylbenzene sulphonate, NANSA YS94 distributed by MARCHON France SA.

| | Initial solution | | Quantity of surfactant |
|---|---|---|---|
| Surfactant | | Concentration (g/l) | adsorbed (mg/g of sand) |
| NANSA | | 5 | 4.0 |
| NANSA + GH 153 | | 5 | 0.8 |
| | | 3 | (n.d.) |

EXAMPLE 4

The conditions are the same as in Example 1, but the DOS was replaced by a non-ionic surfactant, ethoxylated nonylphenol (9 ethylene oxides) Rhodiasurf NP9 (Rhône-Poulenc, France).

| Initial solution | | Quantity of surfactant adsorbed (mg/g of sand) |
|---|---|---|
| Surfactant | Concentration (g/l) | |
| NP9 | 5 | 5.8 |
| NP9 + GH 153 | 5 3 | 4.1 (n.d.) |

In addition to the synergic effect observed, an improved solubilization of the surfactants in the initial solution in the presence of sophorolipids was noted, which allows them to be used over a wider range of concentrations.

EXAMPLE 5

The conditions are the same as those in Example 1, except that the sophorolipids were replaced by rhamnolipid in acid form, RL1 (Petrogen Inc. (Ill.)) whose lipid chain contains 10 carbon atoms (n=6, $a_{average}$=1.5, b=2, $R_1$=$R_2$=H).

The results are given in the table below.

| Initial solution | | Quantity of surfactant adsorbed (mg/g of sand) |
|---|---|---|
| Surfactant | Concentration (g/l) | |
| DOS | 3 | 1.8 |
| RL1 | 3 | 1.9 |
| DOS + RL1 | 3 3 | 1.0 (n.d.) |

(n.d.) non determined

EXAMPLE 6

The conditions are the same as in Example 5, but the acid rhamnolipid was esterified with methanol.

| Initial solution | | Quantity of surfactant adsorbed (mg/g of sand) |
|---|---|---|
| Surfactant | Concentration (g/l) | |
| DOS | 3 | 1.8 |
| RL1 esterified | 3 | 2.0 |
| DOS + RL1 esterified | 3 3 | 1.1 (n.d.) |

(n.d.) non determined

In addition to the synergic effect observed, an improved solubilization of the surfactants in the initial solution in the presence of glycolipids was noted, which allows them to be used over a wider range of concentrations.

EXAMPLE 7

This example illustrates the synergic effect obtained by mixing a conventional surfactant, sodium dioctyl-sulphosuccinate (DOS), and sophorolipids (partially delactonized and partially deacetylated methyl esters or GH 153) on the lowering of the interfacial tension between tap water containing 2 g/l of sodium chloride and hydrocarbons of a lorry diesel oil.

The interfacial tension is measured at 20° C. using a revolving drop tensimeter. The measurement is carried out when the diameter of the drop of hydrocarbon has reached a constant value, after at least 30 minutes of rotation of the capillary tube. The values obtained are given in the table below. The concentrations are expressed in grams of active ingredient per liter of solution.

| Surfactant | Concentration (g/l) | Interfacial tension solution-diesel oil (mN/m) |
|---|---|---|
| DOS | 5 | 0.31 |
| GH 153 | 5 | 1.31 |
| DOS + GH 153 | 3 2 | 0.07 |
| DOS + GH 153 | 5 1 | 0.09 |

EXAMPLE 8

The conditions are the same as in Example 7, but the DOS was replaced by Petrostep B100. Also, the measurements were carried out with tap water containing or not containing added sodium chloride.

| | | Interfacial tension (mN/m) solution-diesel oil | |
|---|---|---|---|
| Surfactant | Concentration (g/l) | Tap water | Tap Water + 2 g/l NaCl |
| B100 | 5 | 0.23 | 0.018 |
| GH 153 | 1 | 1.49 | — |
| GH 153 | 5 | — | 1.31 |
| B100 + GH 153 | 5 1 | 0.013 | 0.008 |
| B100 + GH 153 | 1 1 | 0.007 | 0.006 |

EXAMPLE 9

The conditions are the same as in Example 7, but the sophorolipid GH 153 was replaced by sophorolipid GH 155, an almost totally delactonized and deacetylated methyl ester.

| Surfactant | Concentration (g/l) | Interfacial tension solution-diesel oil (mN/m) |
|---|---|---|
| DOS | 5 | 0.31 |
| GH 155 | 5 | 1.65 |
| DOS + GH 155 | 3 2 | 0.09 |

EXAMPLE 10

The conditions are the same as in Example 7, but the sophorolipid GH 153 was replaced by sophorolipid SO 1 (direct product originating from fermentation wort) (content in acid form 25%, content in lactone form 75%, rate of acetylation 75%).

| Surfactant | Concentration (g/l) | Interfacial tension solution-diesel oil (mN/m) |
|---|---|---|
| DOS | 5 | 0.31 |
| SO 1 | 5 | 1.10 |
| DOS + SO 1 | 3 2 | 0.03 |

EXAMPLE 11

The conditions are the same as in Example 7, but the sophorolipids GH 153 are replaced by rhamnolipid RL1.

| Surfactant | Concentration (g/l) | Interfacial tension solution-diesel oil (mN/m) |
|---|---|---|
| DOS | 5 | 0.31 |
| RL1 | 5 | 1.40 |
| DOS + RL1 | 3 2 | 0.08 |

EXAMPLE 12

The conditions are the same as in Example 11, but the rhamnolipid in acid form was completely esterified with methanol.

| Surfactant | Concentration (g/l) | Interfacial tension solution-diesel oil (mN/m) |
|---|---|---|
| DOS | 5 | 0.31 |
| RL1 ester | 5 | 1.51 |
| DOS + RL1 ester | 3 2 | 0.08 |

EXAMPLE 13

The phenomena of lixiviation and biodegradation of the hydrocarbons trapped in a porous mixture are revealed in the laboratory under the following conditions:

The experimental device comprises a glass column in order to avoid adsorption of the hydrocarbons; it is thermostatically-controlled at 15° C. in order to approach the heat conditions encountered in groundwater tables. It is protected from light to avoid possible abiotic phenomena of photooxidation of the hydrocarbonated compounds. The porous medium used, partly filling the column (the filling depth of a column which is 30 cm long and has an inner diameter of 2.5 cm is 17.5 cm, corresponding to a weight of sand of 400 g), is a coarse Loire silica sand GS 20 with a granulometric distribution comprised at 95% between 590 and 840 μm, calcinated 8 hours beforehand at 800° C. in order to eliminate any organic substance which could interfere. The permeability of this sand is of the order of $3 \times 10^{-3}$ m/s and its density is 1.51.

This device allows the simulation of porous media with residual concentrations of water and of oil representative of a soil polluted by hydrocarbons. Using a pump, the column is filled with water from the bottom. At the same time sand is poured in from the top which is then allowed to drain. The sand is then inoculated from the top and the bottom of the column with a preculture of a mixture of bacterial strains belonging to the Pseudomonas, Flavobacterium, Arthrobacter, Corynebacterium, Moraxella, Nocardia genera, isolated and selected beforehand for their capacity to degrade hydrocarbons. The sand is then saturated with lorry diesel oil which is injected into the top of the column, and is then allowed to drain.

The actual experiment is then started by carrying out impregnation-drainage cycles with a mineral medium whose composition is as follows: $(NH_4)_2SO_4$: 0.3 g/l, $NH_4NO_3$: 0.15 g/l, $KH_2PO_4$: 0.3 g/l, $Na_2HPO_4$, $2 H_2O$: 0.2 g/l, $MgSO_4$, $7 H_2O$: 0.05 g/l, $CaCl_2$: 0.05 g/l. This medium has added to it the various surfactants tested. Each cycle lasts 6 hours with a filling time of the column with mineral medium of 25 minutes, followed by a rest period of 5 minutes and a drainage phase of 10 minutes, and finally maintaining the drained column for 5 hours 20 minutes.

These successive phases of saturation with water and of drainage allowing a mineral nutriment supply phase and an aeration phase to be alternated respectively.

The residual oil trapped in the sand at the end of the test, after about 60 days, is extracted in a Soxhlet extractor firstly with n-hexane for 8 hours then with methylene chloride for 8 hours. The first organic extract is concentrated by evaporation, and separation of the three families which make up the mixture is carried out, namely aliphatic hydrocarbons, aromatic hydrocarbons and polar compounds, the first two then being quantified by gas chromatography, the third by weighing. The hydrocarbons contained in the second extract (dichloromethane) are analyzed by weighing after evaporation of the solvent and added to those recovered in n-hexane.

The extraction and the analysis of the hydrocarbons entrained by the aqueous effluents are also proceeded with, according to methods comparable to those used for the sand.

The experiment is carried out according to the protocol described previously. The mineral medium, used to impregnate the column, has the non-ionic surfactant of Example 4, NP 9, added to it. The concentration of surfactant is 0.05% (by weight) relative to the mineral medium used.

After 60 days during which the impregnation-drainage cycles of the porous medium are carried out, the test is stopped, the sand and the aqueous effluents are extracted, and the hydrocarbons thus recovered and analyzed.

The initial content of hydrocarbons in the porous medium, which was 41.7 g/kg, is no more than 1.8 g/kg in the sand after 60 days. The proportion of biodegraded hydrocarbons corresponding to the ratio hydrocarbons destroyed/hydrocarbons at time zero (the hydrocarbons destroyed being calculated by the difference between the content at time zero and the contents recovered from the sand at the end of the test and in all the aqueous effluents) is equal to 83.6%.

EXAMPLE 14

Test 13 is repeated, but replacing NP 9 by the sophorolipids GH 153 of Example 1 added to the mineral medium at a rate of 0.05% by weight relative to the mineral medium.

The initial content of hydrocarbons in the porous medium, of 30.1 g/kg, decreased after 60 days to 8.6 g/kg in the sand. The proportion of biodegradation of the hydrocarbons is 54.7%.

EXAMPLE 15

Test 13 is repeated, but adding 0.05% (by weight) of a composition containing an NP 9/GH.153 mixture in a ratio of 3/2 to the mineral medium.

The initial content of diesel oil in the porous medium, of 31.3 g/kg, is no more than 0.8 g/kg in the sand after 60 days of experimentation. The proportion of biodegradation of the hydrocarbons is 87.5%.

EXAMPLE 16

Test 13 is repeated, doubling the concentration of NP 9 in the mineral medium, that being 0.1% by weight.

After the test has been carried out for 60 days, the content of diesel oil in the sand which was initially 44.3 g/kg is no more than 0.9 g/kg and the proportion of biodegradation of the hydrocarbons is 82.0%. It is realized that even by doubling the concentration of NP 9, the values of Example 15 are not obtained.

EXAMPLE 17

Test 13 is repeated, but replacing the non-ionic surfactant, NP 9, by the anionic surfactant of Example 1, sodium dioctylsulphosuccinate (DOS), at a concentration of 0.05% by weight.

The concentration of hydrocarbons in the sand goes from 33.8 g/kg at time zero to 1.8 g/kg after the test has been carried out for 60 days. The proportion of biodegradation of the hydrocarbons is 81.5%.

EXAMPLE 18

Test 17 is repeated, but replacing the anionic surfactant DOS by a DOS, GH 153 sophorolipids mixture in a ratio of 3/2, and at a concentration of 0.05% by weight relative to the mineral medium.

The concentration of hydrocarbons in the sand goes from 38.2 g/kg at time zero to 0.3 g/kg after the test has been carried out for 60 days. The proportion of biodegradation of the hydrocarbons is 98.1%.

EXAMPLE 19

Test 13 is repeated, but replacing the NP 9 by the rhamnolipid RL 1 of Example 5 added to the mineral medium at a rate of 0.05% by weight relative to the mineral medium.

The initial content of hydrocarbons in the porous medium of 33 g/kg went after 60 days to 9.5 g/kg in the sand. The proportion of biodegradation of the hydrocarbons is 53.0%.

EXAMPLE 20

Test 13 is repeated, except that 0.05% (by weight) of a composition containing an NP 9/RL 1 mixture in a ratio of 3/2 is added to the mineral medium.

The initial content of diesel oil in the porous medium of 35 g/kg is no more than 0.9 g/kg in the sand after 60 days of experimentation. The proportion of biodegradation of the hydrocarbons is 86.1%.

EXAMPLE 21

Test 13 is repeated, but replacing the non-ionic surfactant, NP 9, by the anionic surfactant of Example 1, sodium dioctylsulphosuccinate (DOS), at a concentration of 0.05% by weight.

The concentration of hydrocarbons in the sand goes from 33.8 g/kg at time zero to 1.8 g/kg after the test has been carried out for 60 days. The proportion of biodegradation of the hydrocarbons is 81.5%.

EXAMPLE 22

Test 21 is repeated, but replacing the anionic surfactant DOS by a mixture of DOS and rhamnolipid RL 1 in a ratio of 3/2, and at a concentration of 0.05% by weight relative to the mineral medium.

The concentration of hydrocarbons in the sand goes from 35 g/kg at time zero to 0.3 g/kg after the test has been carried out for 60 days. The proportion of biodegradation of the hydrocarbons is 97.9%.

EXAMPLE 23

Tests 13, 19 to 22 were repeated with a glycolipid which is the cellobioselipid produced by Ustilago with $R_1$=H; $R_{12}$=15; $R_{13}$=acetyl; $R_{14}$=4, then esterified and approximately equivalent results were obtained.

EXAMPLE 24

The advantageous properties of the sophorolipids were confirmed by tests for extraction of a pollutant, lorry diesel oil, trapped in a porous medium.

The experimental procedure includes the following stages:

Saturation, with tap water, of a column 25 cm long and 2 cm in diameter, filled with the sand described in Example 1.

Displacement of a part of this water by injection of the pollutant until irreducible saturation in water is obtained.

Injection of tap water until residual saturation in pollutant is obtained.

Injection of tap water containing 10 g/l of surfactants (in active ingredient), followed by an injection of tap water. Each of these last two injections represents 5 times the pore volume ($V_p$) of the column.

In the table below, the effectiveness of a DOS and GH 153 mixture for extracting the residual pollutant is compared with that of a mixture of conventional surfactants (DOS-NP9). The composition of the two formulations was adjusted so as to present an optimum extraction effectiveness. With this aim, on the one hand the salinity of the solution of DOS-GH 153 was increased by 1.5 g/l of NaCl, that of the solution of DOS-NP9 was increased by 5.0 g/l of NaCl. On the other hand the weight ratio of DOS-GH 153 was fixed at 5, that of the DOS-NP9 mixture at 2.33.

| Solution of surfactants | Quantity of pollutant extracted (% of residual pollutant) | | | |
|---|---|---|---|---|
| (10 g/l) | $2V_p$* | $4V_p$* | $6V_p$* | $10V_p$* |
| DOS-NP 9 | 0.4 | 38.9 | 57.5 | 95.6 |
| DOS-GH 153 | 22.5 | 73.5 | 100.0 | — |

*Total volume injected, expressed in pore volume, from the start of the injection of the solution of surfactants.

We claim:

1. A decontamination process for a porous medium polluted by hydrocarbons, said process comprising introducing into said porous medium an aqueous composition containing by weight:

0.01% to 99.99% of at least one anionic and/or non-ionic surface active compound and 99.99 to 0.01% of at least one glycolipid, in sufficient quantity and under the appropriate conditions in order to substantially decontaminate the medium, and recovering at least part of the solution containing at least a part of the hydrocarbons.

2. A process according to claim 1, wherein the glycolipid is selected from the group consisting of sophorolipids, rhamnolipids, glucoselipids, trehaloselipids and cellobioselipids in their crude form.

3. A process according to claim 2, in which the glycolipid comprises sophorolipids in their crude form which are at least in part deacetylated and/or at least in part delactonized.

4. A process according to claim 2, in which the glycolipid comprises cellobioselipids which are at least in part deacetylated.

5. A process according to claim 1, in which 0.1 to 20 pore volumes of the aqueous solution containing the composition is introduced into said medium at a concentration of 0.1 to 20 grams per liter.

6. A process according to claim 1, in which the aqueous solution contains 0.01 to 1% by weight of at least one additive selected from the group consisting of sodium nitrate, potassium nitrate, ammonium nitrate, potassium phosphate, sodium phosphate, ammonium phosphate and a composition of hydrosoluble polymers of high molar mass.

7. A process according to claim 1, in which $1 \times 10^5$ to $1 \times 10^9$ hydrocarbon-destroying bacteria per milliliter of aqueous solution are introduced into the polluted medium.

8. A process according to claim 1, wherein said composition contains, by weight, 50 to 60% of at least one anionic and/or non-ionic surface active compound.

9. A process according to claim 1, wherein said composition contains, by weight, 35–50% of said at least one glycolipid.

10. A process according to claim 8, wherein said composition contains, by weight, 35–50% of said at least one glycolipid.

11. A process according to claim 1 comprising at least one anionic surface active compound.

12. A process according to claim 1 comprising at least one non-ionic surface active compound.

13. A process according to claim 1, wherein the at least one surface active compound is sodium dioctylsulphosuccinate, a petroleum sulphonate, isopropyl amine dodecyl benzene sulphonate or an ethoxylated nonylphenol having between 8 and 24 ethoxyl groups.

14. A process according to claim 1, wherein the glycolipid is at least in part in the form of ester.

15. A decontamination process for a porous medium polluted by hydrocarbons comprising a composition containing by weight:

0.01 to 99.99% of at least one cationic or zwitterionic surface active compound and 99.99 to 0.01% of at least one glycolipid, that is introduced in aqueous solution into the said medium in sufficient quantity and under the appropriate conditions in order to substantially decontaminate the medium, and at least a part of the solution containing at least a part of the hydrocarbons is recovered.

* * * * *